(12) United States Patent
Breker et al.

(10) Patent No.: US 6,421,366 B1
(45) Date of Patent: Jul. 16, 2002

(54) METHOD AND DEVICE FOR SUPPLYING AN ELECTRIC ARC MELTING FURNACE WITH CURRENT

(75) Inventors: Dirk Breker, Selm; Bernhard Espendiller, Duelmen; Guido Grund, Dorsten; Klaus Schmale, Moers, all of (DE)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 09/959,072

(22) PCT Filed: Apr. 20, 2000

(86) PCT No.: PCT/DE00/01305

§ 371 (c)(1),
(2), (4) Date: Nov. 21, 2001

(87) PCT Pub. No.: WO00/65878

PCT Pub. Date: Nov. 2, 2000

(30) Foreign Application Priority Data

Apr. 23, 1999 (DE) .......................... 199 20 049

(51) Int. Cl.⁷ .............................................. H05B 7/144
(52) U.S. Cl. .................... 373/102; 373/104; 373/108
(58) Field of Search ................. 373/102, 104, 373/105, 108, 47, 49, 70; 323/207–211; 361/111, 113; 363/70

(56) References Cited

U.S. PATENT DOCUMENTS

| | | | | |
|---|---|---|---|---|
| 4,857,821 A | * | 8/1989 | Takeda ...................... 323/210 |
| 5,463,653 A | * | 10/1995 | Du Parc et al. ............ 373/102 |
| 5,610,937 A | * | 3/1997 | Gaupp ........................ 373/102 |
| 5,627,454 A | * | 5/1997 | Aebischer et al. .......... 323/210 |
| 5,809,054 A | * | 9/1998 | Oelscher ..................... 373/104 |

FOREIGN PATENT DOCUMENTS

| | | | |
|---|---|---|---|
| DE | 04118756 | * | 12/1992 |
| EP | 0766374 | * | 4/1997 |

* cited by examiner

*Primary Examiner*—Tu Ba Hoang
(74) *Attorney, Agent, or Firm*—Cohen, Pontani, Lieberman & Pavane

(57) ABSTRACT

The invention pertains to a process and to a device for supplying current to an electric-arc melting unit for melting and heating metal, especially steel, with a three-phase a.c. source, which sends the current via devices for producing direct current or alternating current to at least one electrode projecting into the vessel of the melting unit. The three-phase a.c. source (91) is followed by at least two power supply modules (41, 4n), connected in parallel, where each power supply module (41; 4n) has an uncontrolled three-phase bridge (51, 5n), a direct-current intermediate circuit (61, 6n), and a transistor unit (71, 7n) connected in series, and where, downline from the power supply modules (41, 4n) in the current flow direction, a common current-carrying line (31) leads to at least one electrode (21) of the melting unit (11) and away from at least one other electrode (22, 24).

14 Claims, 3 Drawing Sheets

METHOD AND DEVICE FOR SUPPLYING AN ELECTRIC ARC MELTING FURNACE WITH CURRENT

BACKGROUND OF THE INVENTION

1. Field of the invention

The invention pertains to a process and a corresponding device for supplying current to an electric-arc melting unit for melting and heating metal, especially steel, which unit is operated with at least two electrodes.

2. Description of the Related Art

Metals, especially steel, are usually melted and heated in melting units by means of arcs. These electrically operated melting units, especially arc furnaces, are operated with either direct current, alternating current, or three-phase alternating current. At least one electrode, which passes through the furnace cover and projects into the furnace vessel, is usually used, whereas the other electrodes are either installed like the first or installed in the bottom of the melting vessel.

An arc furnace for the melting and refining of metal, especially steel scrap, is known from DE-OS 2,510,326. The furnace can be operated with a direct-current source and has at least one electrode of a certain polarity. The electrode is mounted in the treatment vessel so that it can make contact with the charge. The furnace also has a number of other electrodes of the opposite polarity, which project into the vessel above the charge. The required electric current is supplied to this known furnace by way of a star-delta-connected transformer. The various phases of the secondary windings of the transformer are connected separately to the phase inputs of a full-wave rectifier.

This known system for supplying the arc with current provides no devices for preventing feedback effects on the mains, nor can the electric power be adjusted to a desired value to melt the charge.

A direct-current electric-arc furnace with an electrode designed as a cathode projecting into the furnace vessel and at least two bottom electrodes is known from DE 4,118,756 C2, where the electrodes are connected by current-carrying lines to controllable rectifiers. At least two sets of 6-pole thyristors are used as rectifiers.

The object of the above-cited document is an attempt to solve the problem of how to influence the arc in a direct-current arc furnace. The disadvantages inherent in the proposed system such as the undesirably high mains feedback effects, poor electrical efficiency, and limited system availability are accepted in return for the ability to control the arc.

A device for supplying a melting unit with direct current is known from DE 195-36,545. This device represents an attempt to solve the problem of how to reduce the mains feedback effects of thyristor control elements. It is known from this document that a certain effect can be exerted on the feedback by controlling the firing angles, but the mains feedback effects which occur can be decreased to only a limited extent. This solution also suffers from the disadvantage that the melting capacity of the system is limited after the failure of one or more components. In addition, the selected type of asymmetrically controlled firing angles for the thyristor control elements leads to interharmonic ripple currents, which represent an undesirable load on the mains.

A device is known from EP 0,429,774 A1, which focuses on the problem of reducing the mains feedback effects of three-phase a.c. furnaces. For this purpose, a controllable choke is proposed, which is connected to the input circuit of the current-supplying three-phase transformer.

The object according to this document, however, can reduce the feedback to the mains only to a limited extent, because the power capacity of the choke connected to the input side has an effect on the process technology behavior of the arc. Thus, additional equipment is usually required to reduce the mains feedback effects to the required extent.

The goal of the invention is to create a process and a corresponding device for supplying current to an electric arc for the melting of metal, especially steel, in which, by the use of a simple design, mains feedback effects are reduced to a minimum, the electrical efficiency is increased, and the service life of the working materials of the melting unit is simultaneously prolonged.

SUMMARY OF THE INVENTION

According to the invention, the electric current from the mains to a three-phase a.c. source is divided overeat least two power supply modules connected in parallel to each other.

Each of the individual power supply modules has an uncontrolled three-phase bridge, a direct-current intermediate circuit, and a transistor unit connected in series in the current flow direction. In each branch circuit, the current is introduced as direct current by the three-phase bridge and stored temporarily in the individual direct-current intermediate circuits. The rectified partial currents are then controlled individually by the transistor units and sent via current-carrying lines to the individual electrodes and back again.

The storage capacities of the individual direct-current intermediate circuits are designed to compensate for the voltage variations arising as a result of the operation of the arc or arcs. This ensures that the load imposed on the mains power supply remains uniform. The individual current modules are designed in such a way and provided in such number that the reactive power uptake of the power supply unit can be kept constant.

In addition, the number of power supply module is selected so that, when there is a problem with the working materials, the process can be continued without interruption or limitation of the required power while certain specific modules or components are removed.

In an advantageous design, the transistor units of each power supply module are provided with components by means of which the level of the current and its form can be controlled in correspondence with the power required for the melting process while the power factor is kept constant at the same time.

In addition, each of the transistor units is connected to a control unit, by means of which the type of current can be selected. It is possible according to the invention to use the proposed power supply to generate direct current, single-phase alternating current, or three-phase alternating current.

The melting unit connected via current-carrying lines to the power supply has electrodes appropriate to the type of current, which electrodes either project down into the furnace vessel from above or are designed as bottom electrodes.

The power supply modules can be connected individually or in groups to phase-shifted, three-phase power sources. This improves the feedback effects on the mains by reducing the ripple currents resulting from the characteristic of an n×6-pulse circuit design.

An example of the invention is shown in the attached drawing.

DESCRIPTION OF THE PREFERRED EMBODIMENT

Figure 1:
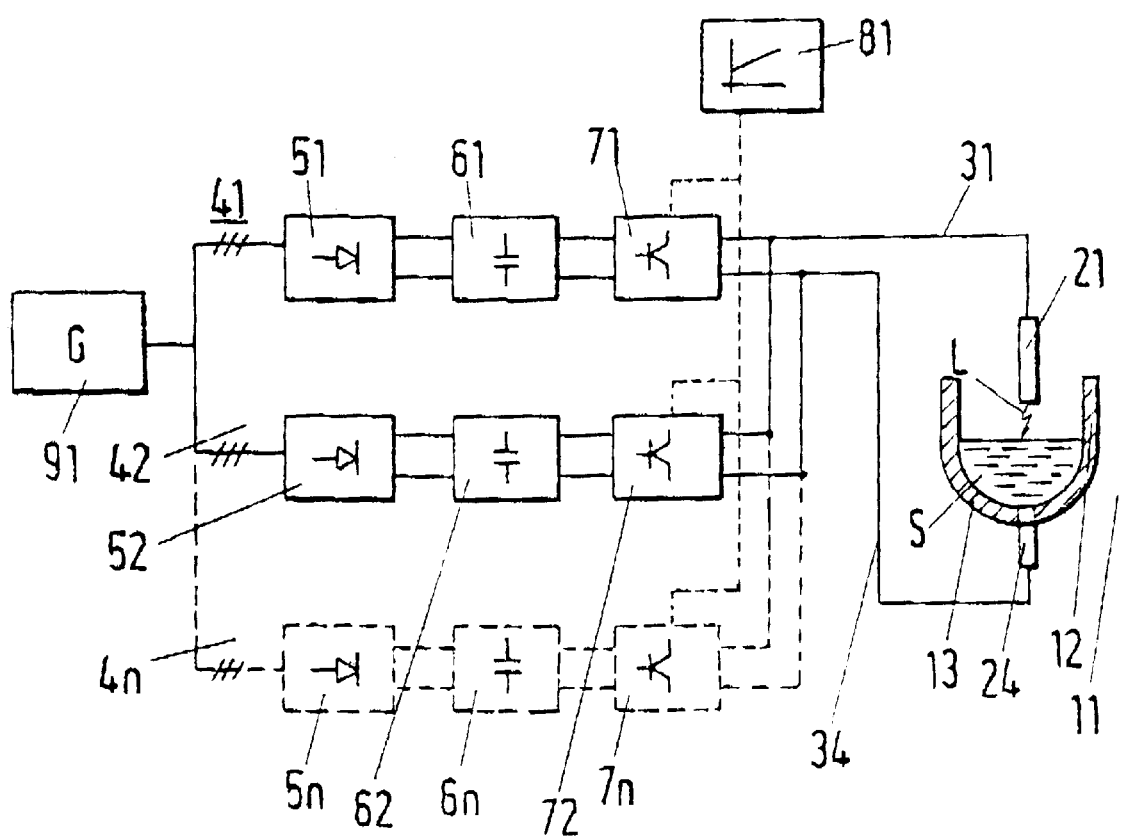
FIG. 1 shows the power supply for direct current.
Figure 2:
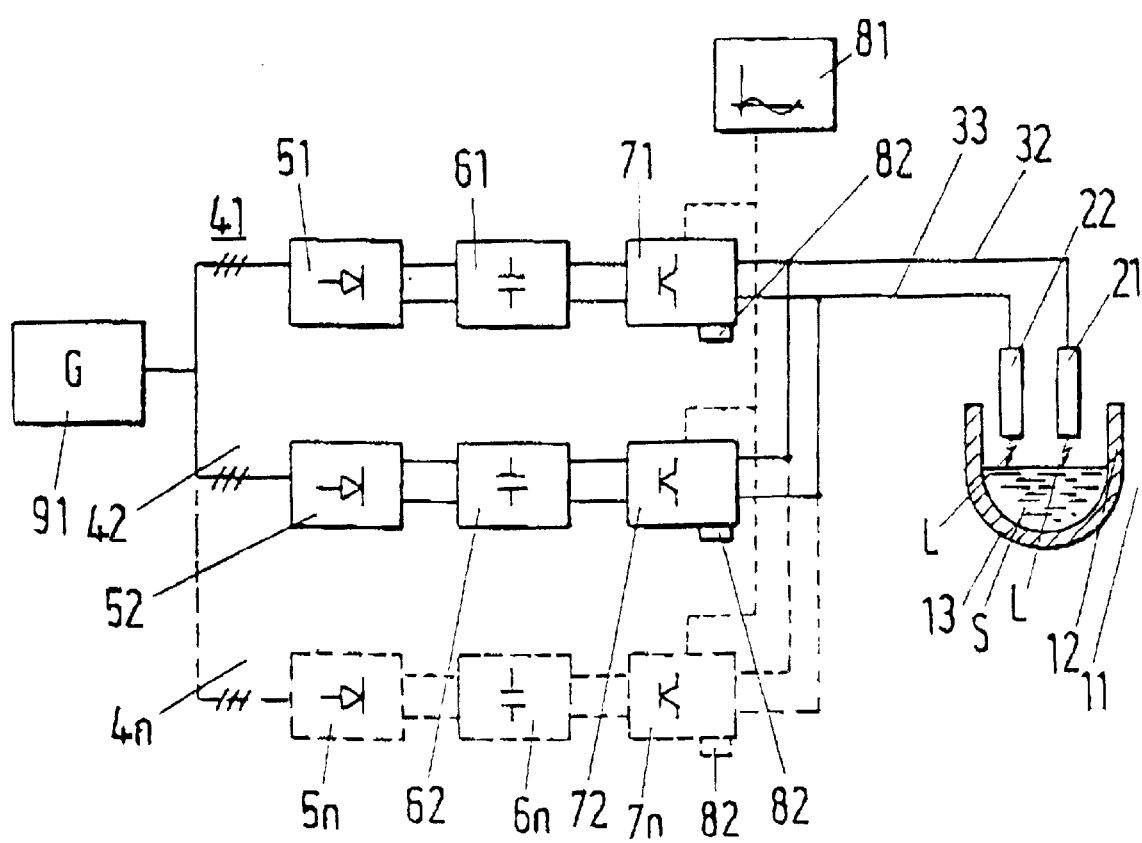
FIG. 2 shows the power supply for single-phase alternating current.
Figure 3:
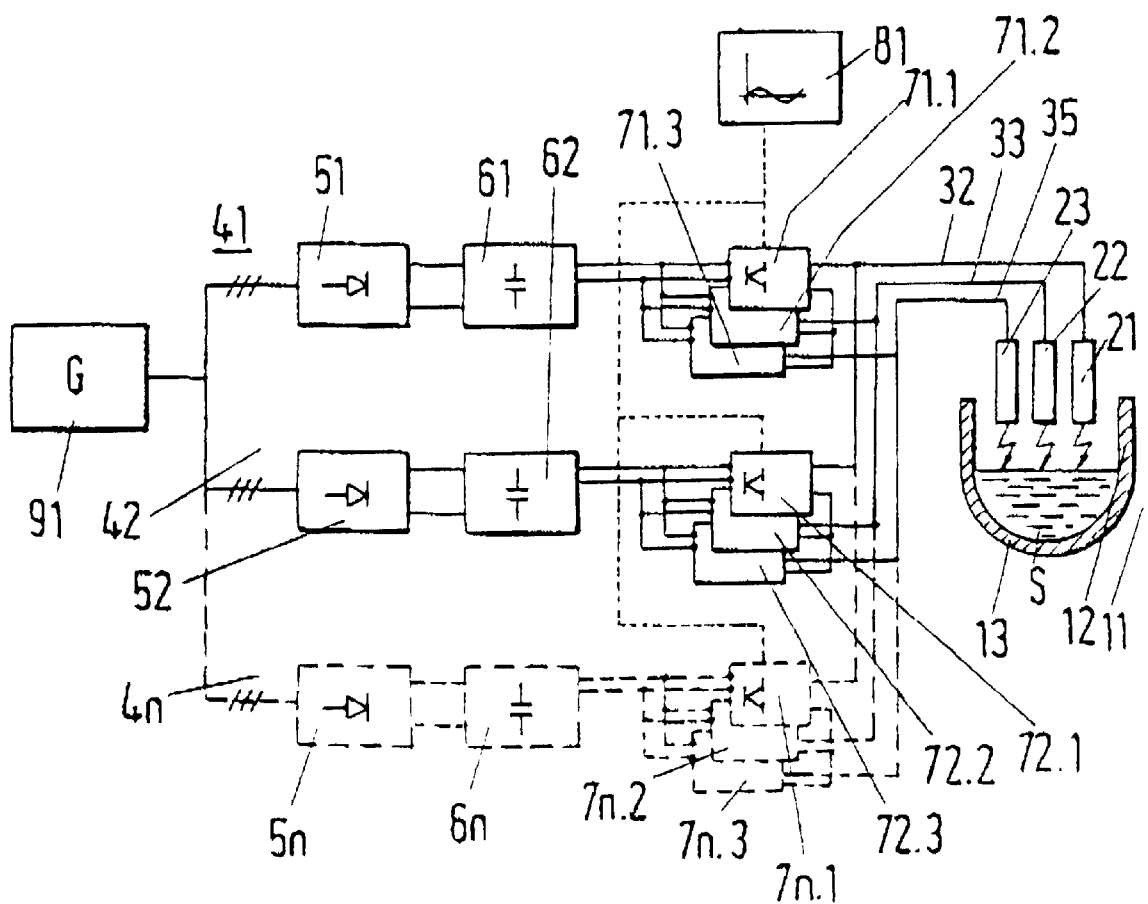
FIG. 3 shows the power supply for three-phase alternating current.

FIGS. 1—3 show a melting unit 11 which has a vessel 12 with a bottom 13, into which the metal charge S has been placed. Electrodes 21 and/or 22 and/or 23 project into the vessel. In FIG. 1 a bottom electrode 24 is also provided in the bottom 13 of the melting unit 11.

In all three figures, a three-phase a.c. source 91 is present, which is connected to the mains (not shown). The three-phase a.c. source 91 is connected to at least two power supply modules 41, 42 and possibly to as many as 4n modules. Each power supply module 41–4n has a three-phase bridge 51–5n, an intermediate circuit 61–6n, and a transistor unit 71–7n, connected in series with it. On the output side, the transistor units 71–7n are connected to the electrodes by a current-carrying line 31 and a return line 34 or by go-and-return lines 32, 33, 35. In addition, the transistor units 71–7n are connected to a control unit 81 by appropriate control lines; in FIG. 1, they are wired for direct current and in FIGS. 2 and 3 for alternating and 3-phase current, respectively.

In FIG. 2, the electrodes 21, 22 project into the furnace vessel 12; they are connected via current-carrying lines 32, 33 to the transistor units 71–7n. The individual transistor units 71–7n have current control components 82, by means of which the level of the current can be controlled in correspondence with the power required during the melting process while keeping the power factor the same.

In FIG. 3, three electrodes 21–23 in all project into the furnace vessel 12 and are connected via current-carrying lines 32, 33, 35 to the individual transistor units 71.1, 71.2, 71.3 to 7n.1, 7n.2, and 7n.3.

In addition, the transistor units 71.1–7n.3 are connected by appropriate control lines to the control unit 81; these transistor units are used to form alternating currents, the sum of which, forming 3-phase alternating currents, is sent to at least three electrodes 21–23 in the vessel 12 and returned again via the three current-carrying lines 32, 33,35.

Although the method and apparatus of the present invention have been described in connection with the preferred embodiment, it is not intended to be limited to the specific form set forth herein, but on the contrary, it is intended to cover such alternatives, modifications, and equivalents as can be reasonably included within the spirit and scope of the invention as defined by the appended claims.

What is claimed is:

1. Process for supplying current to an electric-arc melting unit for melting and heating metal, which unit is operated with at least two electrodes, characterized by the following steps:
   (a) the electric current from mains to a three-phase a.c. source is divided over at least two parallel power supply modules;
   (b) in each power supply module, the current is introduced as direct current via an uncontrolled three-phase bridge;
   (c) then the current is stored temporarily in individual direct-current intermediate circuits;
   (d) the rectified partial currents are controlled individually by transistor units and then;
   (e) brought together in a first current-carrying line and sent to an electrode of the melting unit and, as a function of the selected type of current, returned over a second or third current-carrying from a second or a third electrode or set of electrodes.

2. Process according to claim 1, characterized in that the primary power factor of the power supply module is kept at a constant high level by the three-phase bridge connected to the input side.

3. Process according to claim 1, characterized in that, relative to a predetermined capacitance, the individual direct current intermediate circuits are supplied with an amount of current at which the arc will not exert any negative feedback on the mains regardless of the variations in electrodes.

4. Process according to claim 1, characterized in that the phase shift of the three-phase a.c. source is divided in n-fold phase-shifted windings in such a way that its characteristic corresponds to an n×6-pulse circuit design.

5. Process according to claim 1, characterized in that the rectified partial currents are controlled by the transistor units in such a way that the current conducted to the first current-carrying line is a direct current, which is sent to at least one electrode designed as a cathode.

6. Process according to claim 1, characterized in that the rectified partial currents are controlled by the transistor units in such a way that the current conducted to the current-carrying line is a single-phase alternating current.

7. Process according to claim 1, characterized in that three of the rectified partial currents, which are electrically phase-shifted by 120° by the transistor units, form a three-phase a.c. unit, which is sent over three current-carrying lines as three-phase alternating current to at least three electrodes assigned to the melting.

8. Apparatus for supplying current to an electric-arc melting unit for melting and heating metal, with a three-phase a.c. source, which sends the current via devices for producing direct or alternating current to at least one electrode projecting into the vessel of the melting unit, characterized in that the three-phase a.c. source (91) is followed by at least two power supply modules (41, 4n) connected in parallel to each other; in that each power supply module (41, 4n) has an uncontrolled three-phase bridge (51, 5n), a direct-current intermediate circuit (61, 6n), and a transistor unit (71, 7n), connected in series; and in that, downline from the power supply modules (41, 4n), a common current-carrying line (31) leading to at least one electrode (21) of the melting unit (11) and away from at least one other electrode (22, 24) is provided.

9. The apparatus for supplying current according to claim 8, characterized in that the three-phase bridge (51, 5n) is uncontrolled, and in that it can be used to feed a direct-current intermediate circuit (61, 6n) connected in series with it.

10. The apparatus for supplying current according to claim 9, characterized in that the transistor units (71, 7n) contain components (82) by means of which the level of the current can be controlled in correspondence with the power required during the melting and heating while keeping the power factor constant.

11. The apparatus for supplying current according to claim 10, characterized in that the transistor units (71, 7n) are connected to control devices (81), by means of which direct currents can be formed, which can be sent over a first current-carrying line (31) to at least one electrode (21) in the vessel (12) of the melting unit (11) and back from the vessel

(12) via at least one second electrode (22), a bottom electrode or set of bottom electrodes (24).

12. The apparatus for supplying current according to claim 10, characterized in that the transistor units (71, 7n) are connected to control devices (81), by means of which single-phase alternating currents can be formed, which can be sent via current-carrying lines (31, 32) to at least two electrodes (21, 22) in the vessel (12) of the melting unit (11) and returned from them.

13. The apparatus for supplying current according to claim 10, characterized in that the transistor units (71, 7n) are connected to control devices (81), by means of which alternating currents can be formed, the sum of which, forming three-phase alternating currents, can be sent via three current-carrying lines (32, 33, 35) to at least three electrodes (21, 22, 23 and/or 24) provided in the vessel (12) and also returned from them.

14. The apparatus for supplying current according to claim 13, characterized in that the control devices (81) connected to the transistor units (71, 7n) form alternating currents, which are shifted electrically by 120° from each other.

* * * * *